(12) United States Patent
Yu

(10) Patent No.: US 8,081,447 B2
(45) Date of Patent: Dec. 20, 2011

(54) NOTEBOOK PERSONAL COMPUTER

(75) Inventor: Tzu-Cheng Yu, Shindian (TW)

(73) Assignee: FIH (Hong Kong) Limited, Kowloon (HK)

( * ) Notice: Subject to any disclaimer, the term of this patent is extended or adjusted under 35 U.S.C. 154(b) by 58 days.

(21) Appl. No.: 12/759,759

(22) Filed: Apr. 14, 2010

(65) Prior Publication Data

US 2011/0063797 A1    Mar. 17, 2011

(30) Foreign Application Priority Data

Sep. 15, 2009  (CN) .............................. 200910307002

(51) Int. Cl.
*H05K 5/00* (2006.01)
*H05K 7/00* (2006.01)
(52) U.S. Cl. ......... 361/679.55; 361/379.01; 361/679.26; 361/679.33; 361/679.35; 361/679.37; 361/679.38; 361/679.39; 361/679.56
(58) Field of Classification Search ............. 361/679.01, 361/679.26, 679.33, 679.35, 679.39, 679.38, 361/679.37, 679.55, 679.56
See application file for complete search history.

(56) References Cited

U.S. PATENT DOCUMENTS 7,563,040 B2 *   7/2009   Tsai et al. ..................... 396/428
2010/0039763 A1 *  2/2010   Hsu et al. ................. 361/679.26
* cited by examiner

*Primary Examiner* — Anthony Haughton
(74) *Attorney, Agent, or Firm* — Altis Law Group, Inc.

(57) ABSTRACT

A notebook PC includes a main body, a cover rotatably mounted to the main body, a projector detachably received in the cover and electrically connected to the cover, a holding mechanism received in the cover, and a driving mechanism received in the cover. The holding mechanism releasably holds the projector in place when the projector is received in the cover, and the driving mechanism drives the projector out of the cover when the projector is released by the holding mechanism.

13 Claims, 5 Drawing Sheets

NOTEBOOK PERSONAL COMPUTER

BACKGROUND

1. Technical Field

The present disclosure relates to personal computers (PC), and particularly to a notebook PC with a built-in projector.

2. Description of Related Art

Projectors are often connected to computers to show images displayed by the computers in enlarged sizes on walls or screens. However, conventional projectors are generally difficult to carry due to their large size and weight. Furthermore, when the projectors are frequently used, it is inconvenient to connect and disconnect the projectors to and from the computers frequently. Therefore, miniaturized built-in projectors are already widely used. The built-in projectors are integrated with computers, and thus they can be easily carried and can simplify the connection and disconnection operations. However, if the built-in projectors malfunction, it is difficult to disassemble the computers to examine and repair the projectors.

Therefore, there is room for improvement within the art.

BRIEF DESCRIPTION OF THE DRAWINGS

Many aspects of the present notebook PC can be better understood with reference to the following drawings. The components in the various drawings are not necessarily drawn to scale, the emphasis instead being placed upon clearly illustrating the principles of the present notebook PC. Moreover, in the drawings, like reference numerals designate corresponding parts throughout the figures.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
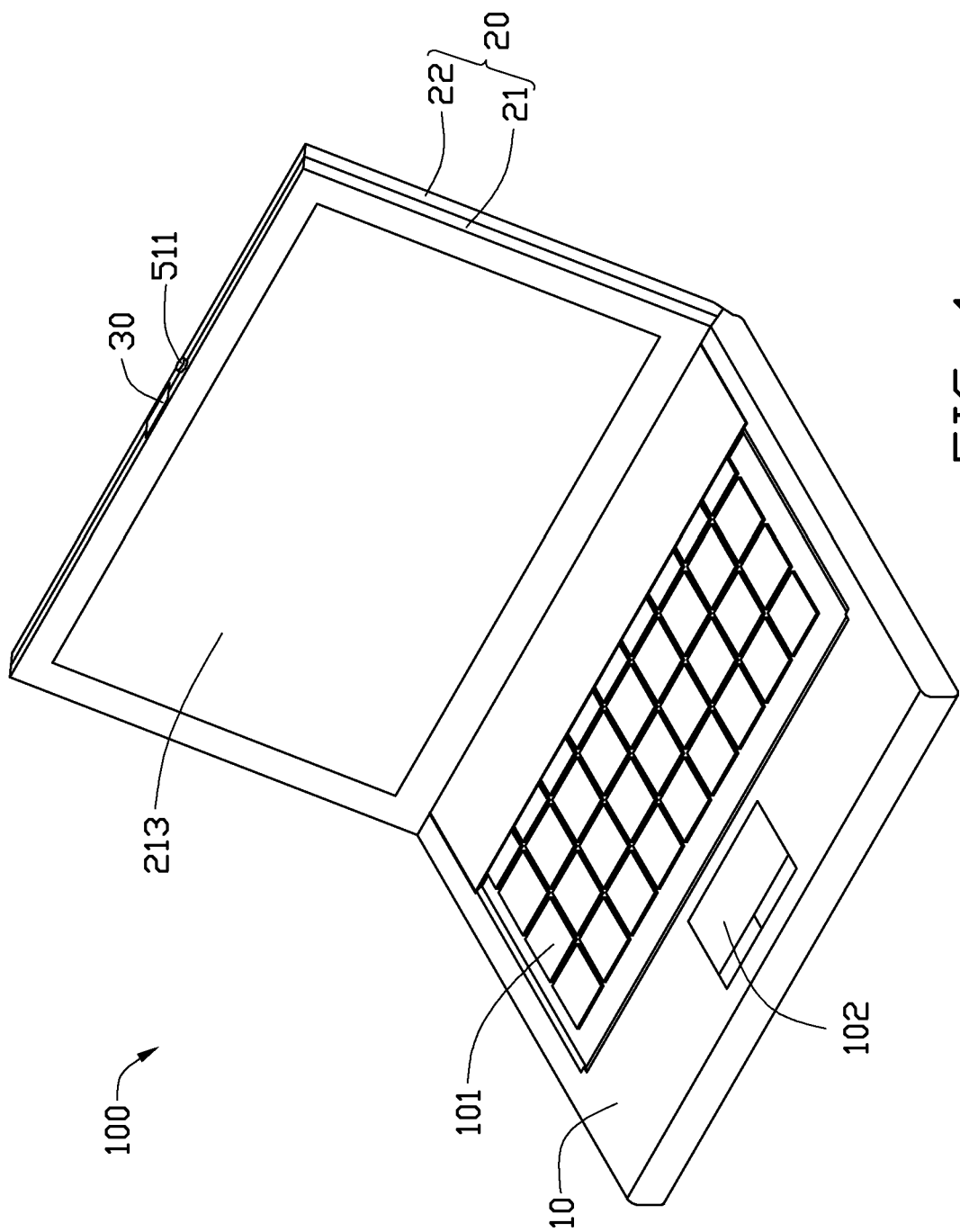
FIG. 1 is a schematic view of a notebook PC, according to an exemplary embodiment.
Figure 2:
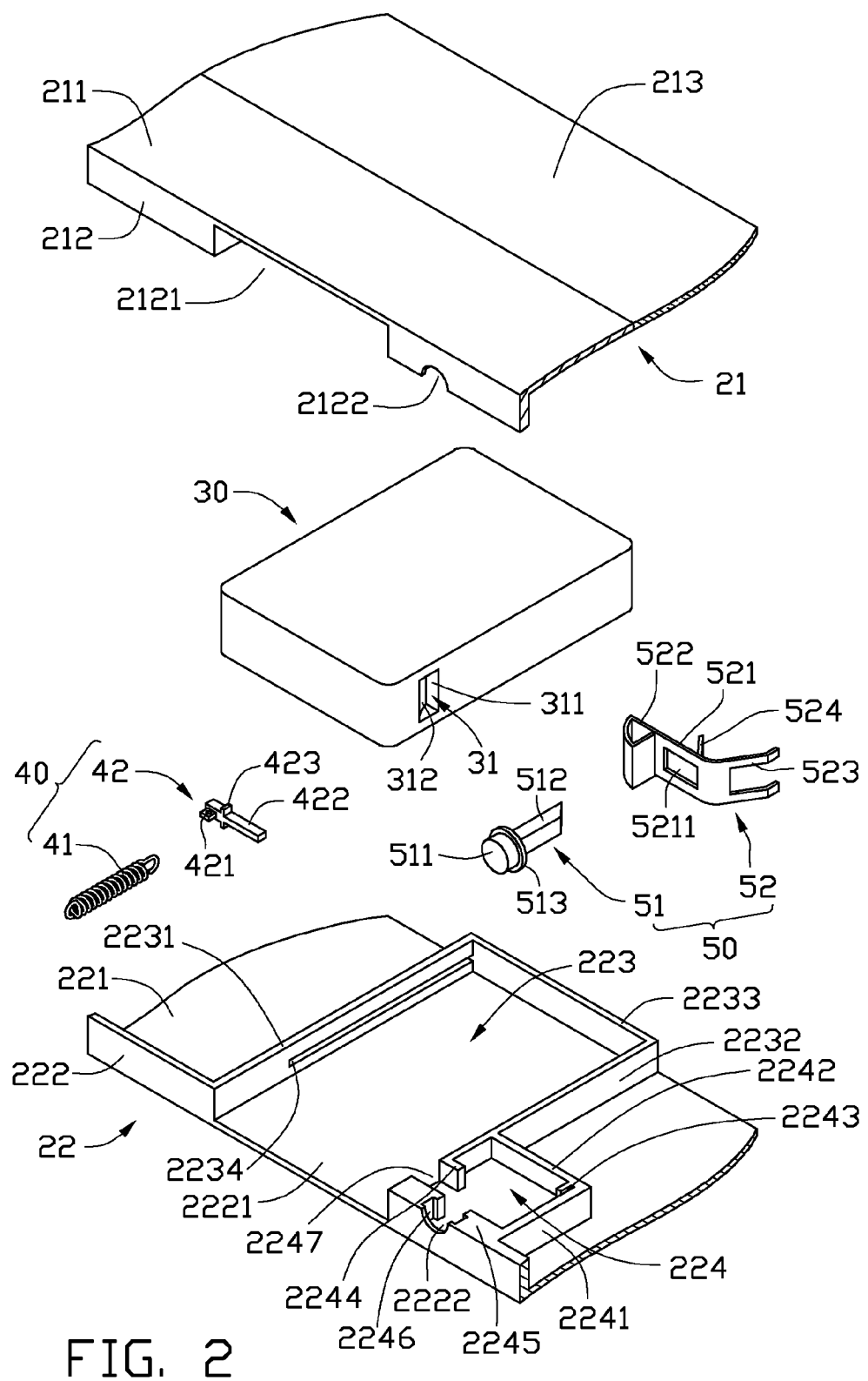
FIG. 2 is a part of a disassembled view of a cover of the notebook PC shown in FIG. 1.

FIG. 1 schematically shows a notebook PC 100, according to an exemplary embodiment. Also referring to FIG. 2, the notebook PC 100 includes a main body 10, a cover 20, a built-in projector 30, a driving mechanism 40, and a holding mechanism 50. The necessary circuits of the PC are received in the main body 10 and the cover 20. The cover 20 is rotatably mounted on the main body 10 and electrically connects to the main body 10. The built-in projector 30 is movably received in the cover 20. The driving mechanism 40 can drive the built-in projector 30 to extend out of the cover 20, and the holding mechanism 50 can hold the built-in projector 30 at predetermined positions.

The main body 10 includes a keypad 101 and a touch control area 102 formed thereon. The cover 20 includes a first panel 21 and a second panel 22. The first panel 21 includes a rectangular first plate 211 and a first frame 212 perpendicularly connected to the periphery of the first plate 211. A display 213 is mounted on a surface of the first plate 211. One side of the first frame 212 defines a rectangular first receiving gap 2121 and a semicircular first operating gap 2122 adjacent to the first receiving gap 2121 therein.

Figure 3:
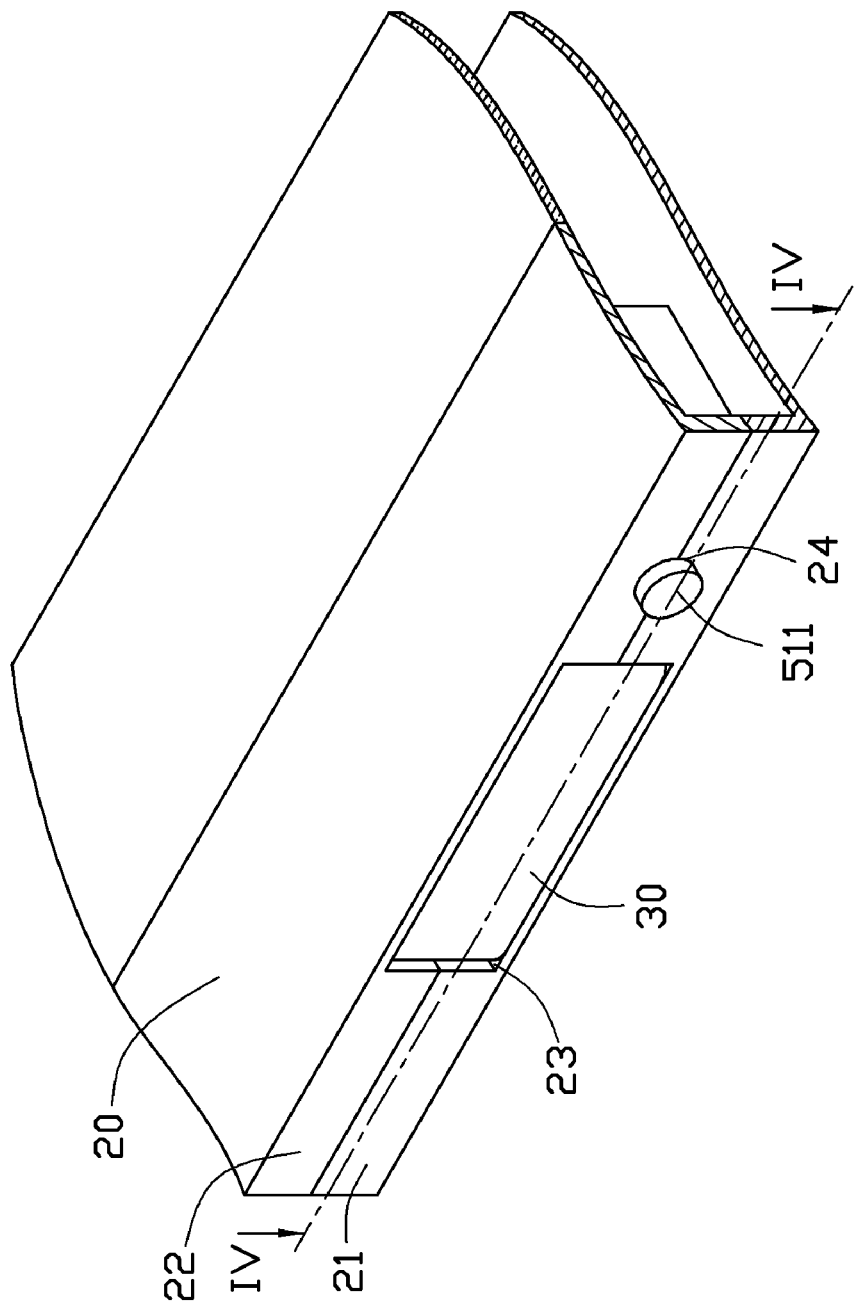
FIG. 3 is an assembled view of the cover of the notebook PC shown in FIG. 2.

The second panel 22 includes a rectangular second plate 221 and a second frame 222 perpendicularly connected to the periphery of the second plate 221. The second plate 221 and the second frame 222 respectively correspond to the first plate 211 and the first frame 212, such that the first panel 21 and the second panel 22 can be assembled together via the first frame 212 and the second frame 222 to form the cover 20. One side of the second frame 222 defines a rectangular second receiving gap 2221 and a semicircular second operating gap 2222 adjacent to the second receiving gap 2221. The second receiving gap 2221 and the second operating gap 2222 respectively correspond to the first receiving gap 2121 and the second operating gap 2122. Also referring to FIG. 3, when the first panel 21 and the second panel 22 are assembled together to form the cover 20, the first receiving gap 2121 and the second receiving gap 2221 are aligned with each other to form a rectangular receiving hole 23, and the first operating gap 2122 and the second operating gap 2222 are aligned with each other to form a round operating hole 24.

Figure 4:
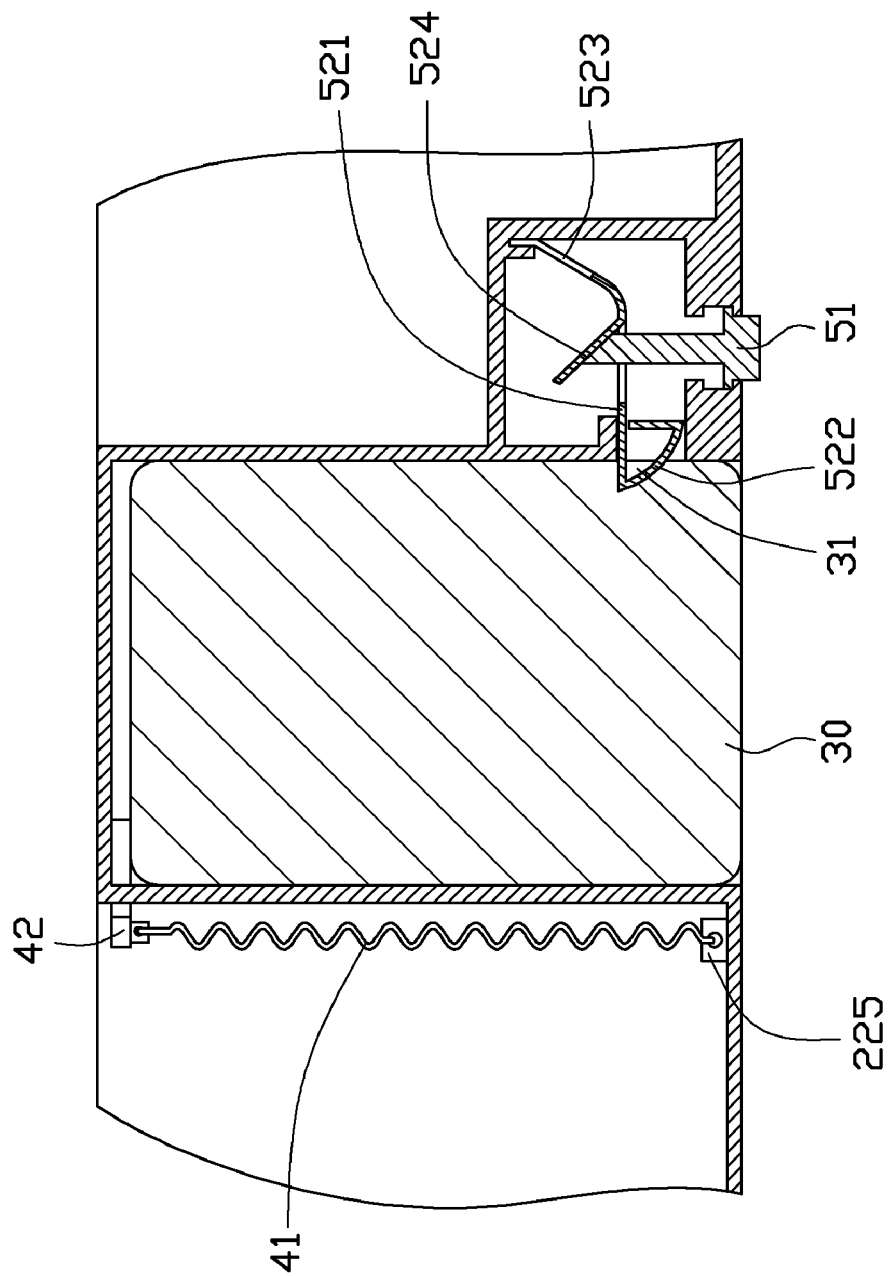
FIG. 4 is a cut-away view along the line IV-IV shown in FIG. 3, wherein a projector is received in the cover.

The second panel 22 further includes a main receiving member 223, a subsidiary receiving member 224, and a connecting protrusion 225 (shown in FIG. 4). The second frame 222, the main receiving member 223, the subsidiary receiving member 224, and the connecting protrusion 225 are all connected to a same surface of the second plate 221. The main receiving member 223 is an approximately U-shaped frame perpendicularly connected to the second plate 221 and opening at the second receiving gap 2221. The main receiving member 223 includes a first sidewall 2231, a second sidewall 2232, and a third sidewall 2233. The first sidewall 2231 is perpendicularly connected to an inner side of the second frame 22. A straight sliding groove 2234 parallel to the second plate 221 is defined in the first sidewall 2231. The second side wall 2232 is perpendicularly connected to the first side wall 2231. The second side wall 2232 is aligned with the second receiving gap 2221, and the lengths of the second side wall 2232 and the second receiving gap 2221 are equal. The third sidewall 2233 is perpendicularly connected to the second side wall 2232 and is positioned parallel to the first sidewall 2231. The third sidewall 2233 is shorter than the first sidewall 2231.

The subsidiary receiving member 224 is approximately a rectangular frame, which includes a fourth sidewall 2241, a fifth sidewall 2242, a fixing portion 2243, a leading portion 2244, and two receiving portions 2245. The fourth sidewall 2241 is parallel to the third sidewall 2233 and perpendicularly connects to an inner side of the second frame 222. The fifth sidewall 2242 has one end perpendicularly connected to the third sidewall 2233 and another end perpendicularly connected to the fourth sidewall 2241. The fixing portion 2243 is a protrusion perpendicularly connected to the fifth sidewall 2242. The fixing portion 2243 extends parallel to the fourth sidewall 2241, thereby forming a holding gap (not labeled) between the fixing portion 2243 and the fourth sidewall 2241. The leading portion 2244 is a planar board perpendicularly connected to an end of the third sidewall 2233 and parallel to the fifth sidewall 2242.

The receiving portions 2245 are two blocks connected to an inner side of the second frame 222. The second opening gap 2222 is positioned between the two operating member receiving portions 2245. Each receiving portion 2245 defines a recess (not labeled) therein. The recesses of the receiving portion 2245 are positioned towards each other, thereby forming a receiving cavity 2246 communicating with the second operating gap 2222. The width of the receiving cavity 2246 is larger than the diameter of the second operating gap 2222. An assembling gap 2247 is formed between the receiving portion 2245 that is proximate to the main receiving member 223 and a planar side surface of the leading portion 2244. Thus, the second receiving member 224 communicates with the first receiving member 223 through the assembling gap 2247. The connecting protrusion 225 is formed adjacent to an outer side of the end of the first sidewall 2231 and connects to the second frame 222.

The projector 30 approximately corresponds in shape and size to the main receiving member 223, such that the projector 30 can be received in the main receiving member 223. The projector 30 defines a retaining groove 31 in a side thereof. A planar latching surface 311 and an arcuate assembling surface 312 corresponding to the retaining groove 31 are formed on the projector 30. The retaining groove 31 is positioned to correspond to the assembling gap 2247. When the projector 30 is entirely received in the main receiving member 223, the retaining groove 31 is aligned with the assembling gap 2247, and the assembling surface 312 is closer to the opening of the main receiving member 223 than the latching surface 311.

The driving mechanism 40 includes a cylindrical spring 41 and a driving member 42. The driving member 42 includes a spring retainer 421, a driving bar 422, and a pair of flanges 423. The width of the driving bar 422 is configured to correspond to the width of the sliding groove 2234, such that the driving bar 422 can be inserted in the sliding groove 2234. The flanges 423 are respectively formed on two opposite sides of the driving bar 423. The spring retainer 421 is a protrusion formed on a side of the driving bar 423 and positioned between the two flanges 423. The sum of the widths of the driving bar 422 and the two flanges 423 is larger than the width of the sliding groove 2234.

The holding mechanism 50 includes an operating member 51 and a holding member 52. The operating member 51 includes a button 511 and a pushing pole 512. The button 511 and the pushing pole 512 are both cylindrical and coaxially connected to each other. The pushing pole 512 has a wedge-shaped distal end. A stopper ring 513 is formed around the button 511 to coaxially surround the button 511. A diameter of the button 511 corresponds to the diameter of the second operating gap 2222. An outer diameter of the stopper ring 513 corresponds to the width of the receiving cavity 2246. A diameter of the pushing pole 512 is less than or equal to a distance between the two receiving portions 2245.

The holding member 52 includes a latching portion 521, an assembling portion 522, two elastic portions 523, and a pushed portion 524. The latching portion 521 is a planar sheet defining an assembling hole 5211 in a central portion thereof. A width of the assembling hole 5211 is greater than or equals the diameter of the pushing pole 512. One end of the latching portion 521 is deformed to be arcuate to form the assembling portion 522. The shape of the assembling portion 522 corresponds to the sliding surface 312. Another end of the latching portion 521 is deformed to a side opposite to the assembling portion 522 and is connected to the two elastic portions 523. The elastic portions 523 are two parallel arms connected to the end of the latching portion 521. The latching portion 521 and each elastic portion 523 form an obtuse angle. The pushed portion 524 is a planar sheet connected to the latching portion 521. The pushed portion 524 and the elastic portions 523 are positioned at a same side of the latching portion 521. The pushed portion 524 is positioned adjacent to the assembling hole 5211, and the latching portion 521 and the pushed portion 524 form an acute angle. The inclining angle of the pushed portion 524 is configured to correspond to the wedge-shaped distal end of the pushing pole 512.

Figure 5:
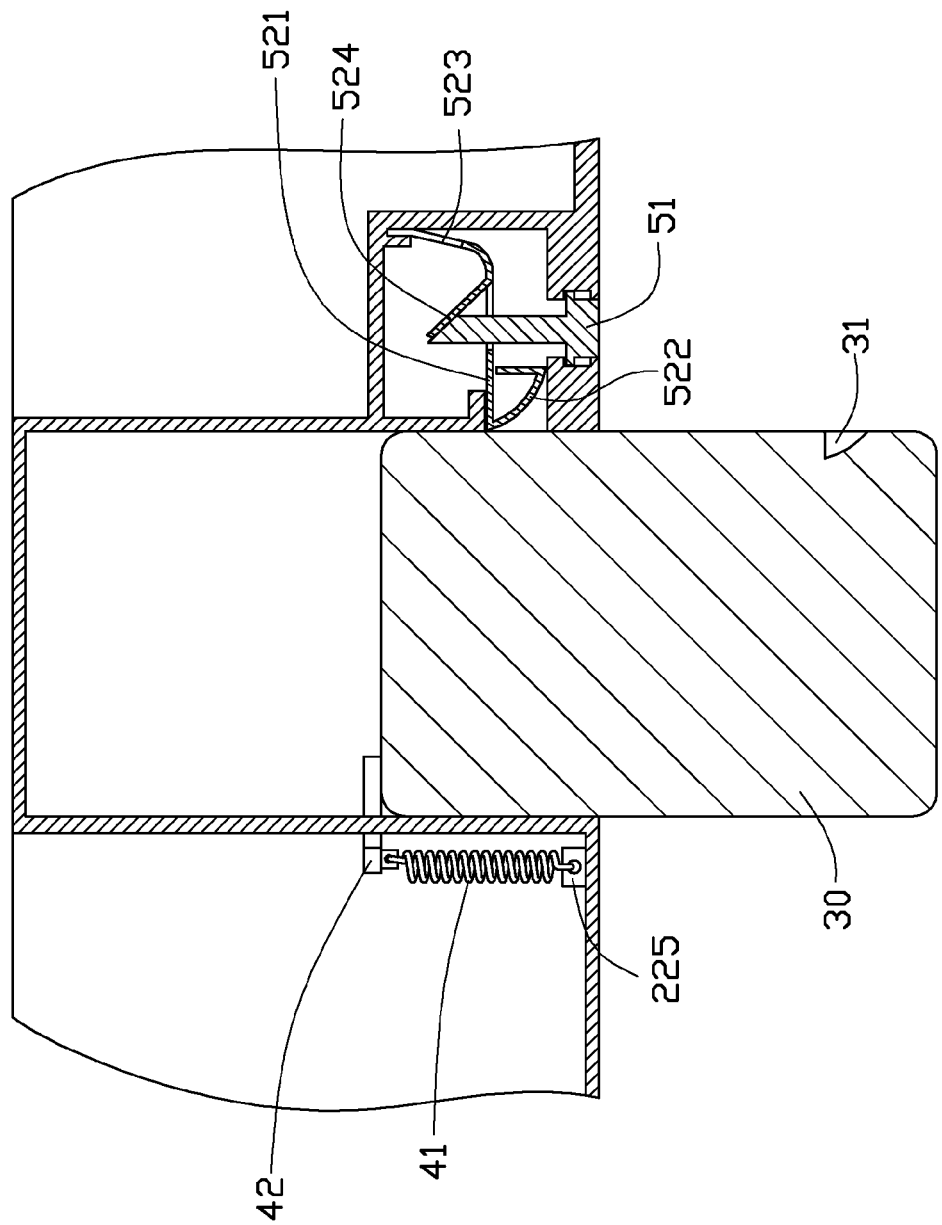
FIG. 5 is similar to FIG. 4, except that the projector extends out of the cover.

Also referring to FIG. 4 and FIG. 5, in assembly, the holding member 52 is received in the subsidiary receiving member 224. The assembling portion 522 is received in the assembling gap 2247. The latching portion 521 and the assembling portion 522 both partially extend into the first receiving member 223 through the assembling gap 2247. The distal ends of the elastic portions 523 are fixed between the fourth sidewall 2241 and the fixing portion 2243. The pushing pole 512 is inserted into the assembling hole 5211, and the wedge-shaped distal end of the pushing pole 512 is pushed to be in contact with the pushed portion 524. The button 511 is received in the second operating gap 2222, and the stopper ring 513 is received in the receiving cavity 2246.

The driving bar 422 is inserted into the sliding groove 2234 and is pushed to enter the main receiving member 223 until the flanges 423 are blocked by the first sidewall 2231. Two ends of the spring 41 are respectively fixed on the connecting protrusion 225 and the spring retainer 421. The projector 30 is aligned with the second receiving gap 2221 and is pushed to move towards the second sidewall 2232 to be received in the main receiving member 223. When the projector 30 moves, the assembling portion 522 is pushed towards the fourth sidewall 2241 by the projector 30. Thus, the latching portion 521 and the assembling portion 522 are pushed out of the main receiving member 223 through the assembling gap 2247, and the elastic portions 523 are deformed. When the projector 30 is further pushed towards the second sidewall 2232, the end of the projector 30 positioned towards the second sidewall 2232 is resisted by the driving bar 422, and the projector 30 drives the driving member 42 towards the second sidewall 2232. Thus, the spring 41 is elongated. When the projector 30 is entirely received in the main receiving member 223, the assembling gap 2247 is aligned with the retaining groove 31. The elastic portions 523 rebound and drive the latching portion 521 and the assembling portion 522 to enter the retaining groove 31. The latching portion 521 contacts the latching surface 311, and the assembling portion 522 is pushed by the rebounding elastic portion 523 to contact the assembling surface 312. In this way, the holding member 50 engages with the projector 30 to hold the projector 30 in the main receiving member 223. The projector 30 is electrically connected to the cover 20 by conventional means, such as cables (not shown).

Finally, the first panel 21 is assembled to the second panel 22 to form the cover 20. The first receiving gap 2121 and the second receiving gap 2221 form the receiving hole 23, and the first operating gap 2122 and the second operating gap 2222 form the operating hole 24. One end of the projector 30 is exposed from the receiving hole 23. The button 511 is exposed out of the operating hole 24. The cover 20 is assembled to the main body 10 and electrically connected to the main body 10. Thus, the notebook PC 100 is completed, and the projector 30 can show images.

When the projector 30 needs to be detached from the notebook PC 100, the button 511 is pressed. The pushing pole 512 is pushed towards the fifth sidewall 2242, and thus the pushed portion 524 is pushed towards the fourth sidewall 2241 by the wedge-shaped distal end of the pushing pole 512. Thus, the elastic portions 523 are deformed, and the latching portion 521 and the assembling portion 522 are driven to move towards the fourth sidewall 2241. When the latching portion 521 and the assembling portion 522 exit from the retaining groove 31, the projector 30 is released. The spring 41 rebounds and drives the driving member 42 to slide along the sliding groove 2234 and move towards the receiving hole 23.

The driving bar 422 then pushes the projector 30 towards the receiving hole 23. Thus, the projector 30 partially exposes out of the cover 20 through the receiving hole 23 and can be easily detached from the notebook PC 100. When the projector 30 needs to be received in the cover 20 again, it can be directly inserted into the receiving hole 23, and then is received and held according to the above-detailed method.

In the present notebook PC 100, the projector 30 is detachably received in the cover 20. The projector 30 can be held in the cover 20 and maintain connection with the cover 20 and/or the main body 10 as conventional built-in projectors, and can also be conveniently detached from the cover 20 to be examined and repaired. Additionally, if the projector 30 can maintain an electric connection with the cover 20 and/or the main body 10 when it partially exposes out of the cover 20, the partially exposed projector 30 can also show images. For example, the projector 30 can be connected to the cover 20 and/or the main body 10 by winding cables (not shown), and the conductive contacts (not shown) corresponding to the partially exposed projector 30 can be mounted in the cover 20. In this way, when the projector 30 is driven to partially expose out of the cover 20, it can maintain electric connection to the notebook PC 100 using the cables or the contacts, and then can show images.

In fabrication, the second side wall 2232 can be integrated with a portion of the second frame 222. The two elastic portions 523 can be integrated with each other to form one wider elastic portion. The projector 30 can also be detachably received in the main body 10 according to the aforementioned structure.

It is to be further understood that even though numerous characteristics and advantages of the present embodiments have been set forth in the foregoing description, together with details of structures and functions of various embodiments, the disclosure is illustrative only, and changes may be made in detail, especially in matters of shape, size, and arrangement of parts within the principles of the present invention to the full extent indicated by the broad general meaning of the terms in which the appended claims are expressed.

What is claimed is:

1. A notebook personal computer (PC), comprising:
   a main body;
   a cover rotatably mounted to the main body;
   a projector detachably received in the cover and electrically connected to the cover, the projector defining a retaining groove;
   a holding mechanism received in the cover; and
   a driving mechanism received in the cover; wherein when the projector is inserted into the cover, the holding mechanism is pressed by the projector and deforms to allow the projector to enter the cover; and when the projector is received in the cover and the retaining groove is aligned with the holding mechanism, the holding mechanism rebounds and engages with the retaining groove to releasably hold the projector; and the driving mechanism drives the projector out of the cover when the projector is released by the holding mechanism.

2. The notebook PC as claimed in claim 1, wherein the driving mechanism includes a spring and a driving member, the spring mounted between the cover and the driving member, the projector resisted by the driving member; the projector held in the cover resisting the driving member to elongate the spring, when the projector is released, the spring rebounds to drive the driving mechanism to move, and the driving mechanism pushes the projector out of the cover.

3. The notebook PC as claimed in claim 2, wherein the cover includes a main receiving member for receiving the projector and a subsidiary receiving member for receiving the holding mechanism, the main receiving member and the subsidiary receiving member being both frames and communicating with each other.

4. The notebook PC as claimed in claim 3, wherein the main receiving member defines a sliding groove, the driving member including a driving bar slidably received in the sliding groove and extending inside the main receiving member to resist the projector through the sliding groove.

5. The notebook PC as claimed in claim 3, wherein the holding mechanism includes a holding member received in the subsidiary receiving member and extending inside the main receiving member.

6. The notebook PC as claimed in claim 5, wherein the holding mechanism further includes an operating member received in the subsidiary receiving member, the holding member including a pushed portion resisted by the operating member, pressure on the operating member driving the pushed portion to move, and further driving the holding member to exit from the retaining groove and releasing the projector.

7. The notebook PC as claimed in claim 6, wherein the holding member further includes at least one elastic portion mounted to the cover, the elastic portion bent when the holding member is driven to exit from the retaining groove.

8. The notebook PC as claimed in claim 6, wherein the cover defines an operating hole, the operating member further including a button exposed out of the operating hole to be operated.

9. The notebook PC as claimed in claim 1, wherein the cover defines a receiving hole, the projector exposing out of the cover through the receiving hole.

10. The notebook PC as claimed in claim 7, wherein the holding member further includes a latching portion and an assembling portion; the latching portion being a planar sheet defining an assembling hole therein; one end of the latching portion deformed to be arcuate to form the assembling portion, and the other end of the latching portion connected to the elastic portion; distal end of the elastic portion fixed on the subsidiary receiving member; the pushed portion being a sheet connected to the latching portion and positioned adjacent to the assembling hole, and the latching portion and the pushed portion forming an acute angle.

11. The notebook PC as claimed in claim 10, wherein the assembling portion extends inside the main receiving member; when the projector is inserted into the cover, the assembling portion is pushed inside the subsidiary receiving member by the projector to allow the projector to enter the cover, and the elastic portion is bent; and when the projector is received in the cover and the retaining groove is aligned with the assembling portion, the elastic portion rebounds and drives the assembling portion to engage with the retaining groove and releasably hold the projector.

12. The notebook PC as claimed in claim 11, wherein the operating member passes through the assembling hole to resist the pushed member; and when the pressure on the operating member drives the pushed portion to move, the assembling portion is driven to exit from the retaining groove and the elastic portion is bent.

13. The notebook PC as claimed in claim 8, wherein the operating member further includes a stopper ring formed adjacent to the button and positioned inside the operating hole, an outer diameter of the stopper ring being larger than a diameter of the operating hole.

* * * * *